United States Patent [19]
Gilley

[11] Patent Number: 5,907,352
[45] Date of Patent: May 25, 1999

[54] DOOR MOUNTABLE SECURITY SYSTEM

[76] Inventor: Terry W. Gilley, 5608 18th Ave., E. Bradenton, Fla. 34208

[21] Appl. No.: 08/803,076

[22] Filed: Feb. 20, 1997

[51] Int. Cl.[6] .................................................... H04N 07/18
[52] U.S. Cl. ............................ 348/151; 348/143; 348/152
[58] Field of Search ................................ 348/14, 13, 151, 348/385, 143, 149, 154, 155, 152, 156, 159; 340/566, 546, 572, 825.31, 825.36; 379/102, 104, 53, 54

[56] References Cited

U.S. PATENT DOCUMENTS

| | | | |
|---|---|---|---|
| 4,227,188 | 10/1980 | Petersen | 340/566 |
| 4,282,518 | 8/1981 | Bonner | 340/566 |
| 4,524,384 | 6/1985 | Lefkowitz et al. | 348/156 |
| 4,709,897 | 12/1987 | Mooney | 248/551 |
| 4,812,824 | 3/1989 | Holt | 340/566 |
| 4,843,461 | 6/1989 | Tatsumi et al. | 348/143 |
| 4,881,135 | 11/1989 | Heilweil | 358/335 |
| 4,982,281 | 1/1991 | Gutierrez | 358/108 |
| 5,359,363 | 10/1994 | Kuban et al. | 348/143 |
| 5,412,708 | 5/1995 | Katz | 348/14 |
| 5,521,634 | 5/1996 | McGary | 348/169 |
| 5,541,585 | 7/1996 | Duhame et al. | 340/572 |
| 5,625,410 | 4/1997 | Washino et al. | 348/154 |

*Primary Examiner*—Tommy P. Chin
*Assistant Examiner*—Anand Rao
*Attorney, Agent, or Firm*—Joseph N. Breaux

[57] ABSTRACT

A door mountable security system including a first fiber optic image conduit, a video camera having a lens visually coupled to one end of the fiber optic image conduit and a first video output; a miniature video recorder operable from a battery power source, the miniature video recorder having a video input in connection with the video output of the video camera and an electrically activated record control input; a battery pack in power supply connection with the miniature video recorder and having sufficient power output to power the miniature video recorder; a motion detecting device including a pendulum switch having an electrically conductive plumb-bob pendulum contact and an electrically conductive metal ring contact; and a timer output device having a timed control output in electrical connection with the electrically activated record control input of the miniature video recorder and an electrical control input in electrical connection with the pendulum switch in a manner such that electrical contact between the pendulum contact and the ring contact causes the timed output of the timed output device to generate a signal activating the record control input of the video recorder for a predetermined period of time.

10 Claims, 3 Drawing Sheets

DOOR MOUNTABLE SECURITY SYSTEM

TECHNICAL FIELD

The present invention relates to security systems for buildings and more particularly to a door mounted security system having at least one fiber optic image conduit, a video camera having a lens visually coupled to one end of the fiber optic image conduit, a video recording device in connection with the video camera, and a motion detecting device in controlling connection with the video recording device in a manner such that upon receipt of a signal from the motion detecting device the video recording device records the signal from the video camera for a predetermined period of time.

BACKGROUND OF THE INVENTION

Providing security for commercial and residential buildings and the like has become increasingly important. Because some crimes can be attributable to employees and other individuals authorized to enter and leave the building it would be a benefit to have a security device for monitoring the comings and goings of these individuals through an access door that did not entail the expense of a full time guard. In addition, it would be a further benefit if the security device could be mounted within an existing door in an inconspicuous manner. It would be a still further benefit to have a door mountable security system that would make a visual recording of each individual entering and leaving a building that could be stored and kept for a period of time.

SUMMARY OF THE INVENTION

It is thus an object of the invention to provide a security device for monitoring the comings and goings of individuals through an access door of a building.

It is a further object of the invention to provide a door mountable security system that can be mounted within an existing door in an inconspicuous manner.

It is a still further object of the invention to provide a door mountable security system that can make a visual recording of each individual entering and leaving a building that can be stored and kept for a period of time.

It is a still further object of the invention to provide a door mountable security system that has at least one fiber optic image conduit, a video camera having a lens visually coupled to one end of the fiber optic image conduit, a video recording device in connection with the video camera, and a motion detecting device in controlling connection with the video recording device in a manner such that upon receipt of a signal from the motion detecting device the video recording device records the video signal from the video camera for a predetermined period of time.

It is a still further object of the invention to provide a door mountable security system that accomplishes all or some of the above objects in combination.

Accordingly, a door mountable security system is provided. The security system includes a first fiber optic image conduit, a video camera having a lens visually coupled to one end of the fiber optic image conduit and a first video output; a miniature video recorder operable from a battery power source, the miniature video recorder having a video input in connection with the video output of the video camera and an electrically activated record control input; a battery pack in power supply connection with the miniature video recorder and having sufficient power output to power the miniature video recorder; a motion detecting device including a pendulum switch having an electrically conductive plumb-bob pendulum contact and an electrically conductive metal ring contact; and a timer output device having a timed control output in electrical connection with the electrically activated record control input of the miniature video recorder and an electrical control input in electrical connection with the pendulum switch in a manner such that electrical contact between the pendulum contact and the ring contact causes the timed output of the timed output device to generate a signal activating the record control input of the video recorder for a predetermined period of time.

In a preferred embodiment, the door mountable security system further includes a second fiber optic image conduit and a prism image splitter, and the first and second fiber optic image conduits are visually coupled to the video camera through the prism image splitter.

In another preferred embodiment, the door mountable further includes a door having a security device chamber formed therein and sized to receive the video camera, the miniature video recorder, the battery pack, the motion detecting device, and the timer output device; and one end of the first fiber optic image conduit is positioned within a hole formed through an external surface of the door.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
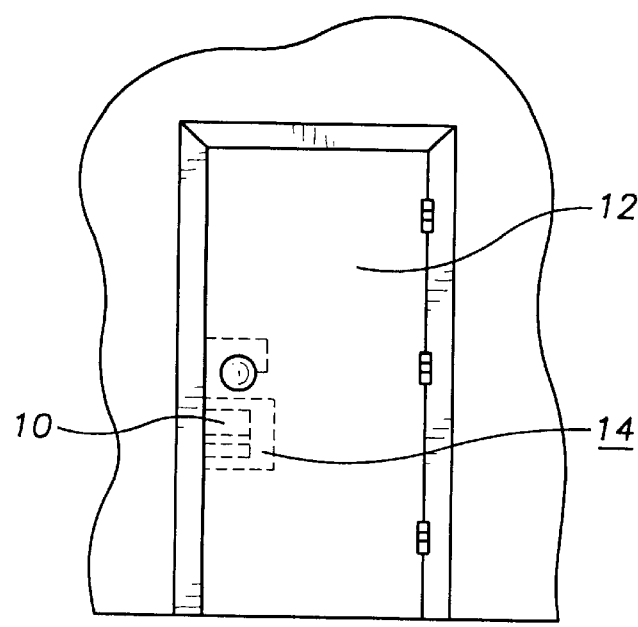
FIG. 1 is a plan view of an exemplary embodiment of the door mountable security system of the present invention mounted within a representative door having a security device chamber formed therein.
Figure 2:
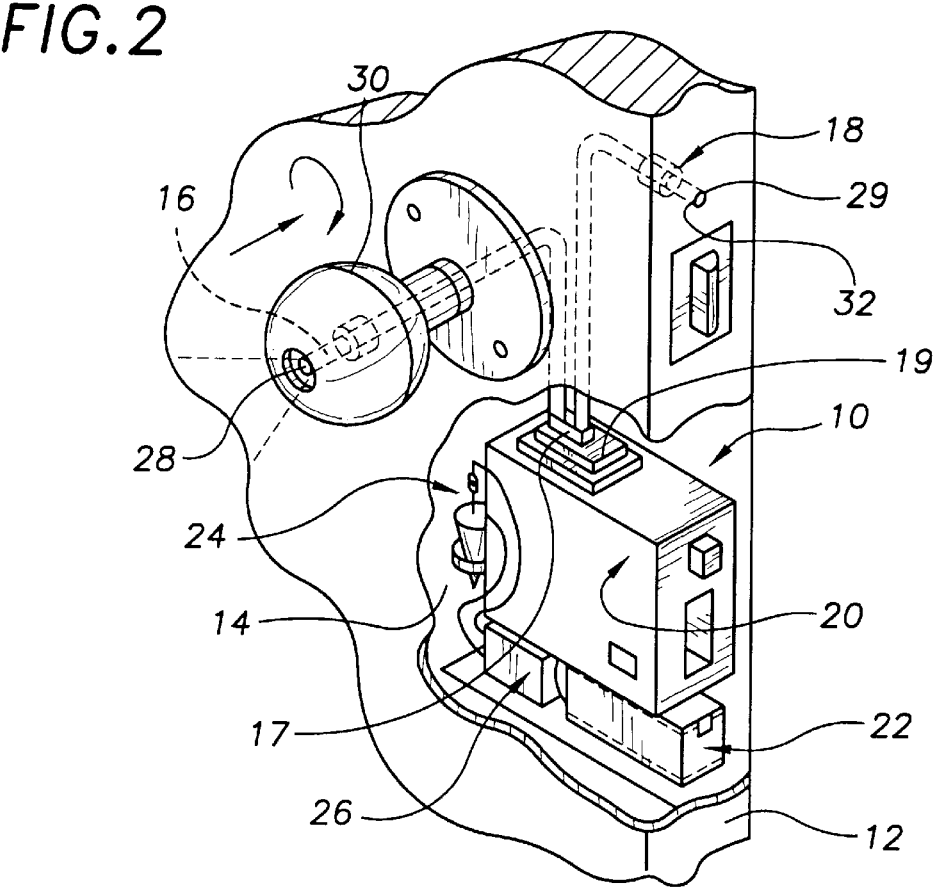
FIG. 2 is a partial cut-away, perspective view of the exemplary door mountable security system of FIG. 1 showing the security device chamber, the first fiber optic image conduit, the second fiber optic image conduit, the video camera, the miniature video recorder, the battery pack, the motion detecting device, and the timer output device.

FIG. 1 shows an exemplary embodiment of the door mountable security system of the present invention, generally designated by the numeral 10, mounted within a representative door 12 having a security device chamber 14 formed therein. With reference to FIG. 2, door mountable security system 10 is sized to fit within security device chamber 14. In this embodiment, door mountable security system 10 includes a first fiber optic image conduit, generally designated by the numeral 16; a prism image splitter 17;

a second fiber optic image conduit, generally designated by the numeral 18; a video camera 19, a miniature high-8 format video recorder, generally designated by the numeral 20; a battery pack, generally designated by the numeral 22; a motion detecting device, generally designated by the numeral 24; and a timer output device, generally designated by the numeral 26.

Figure 3:
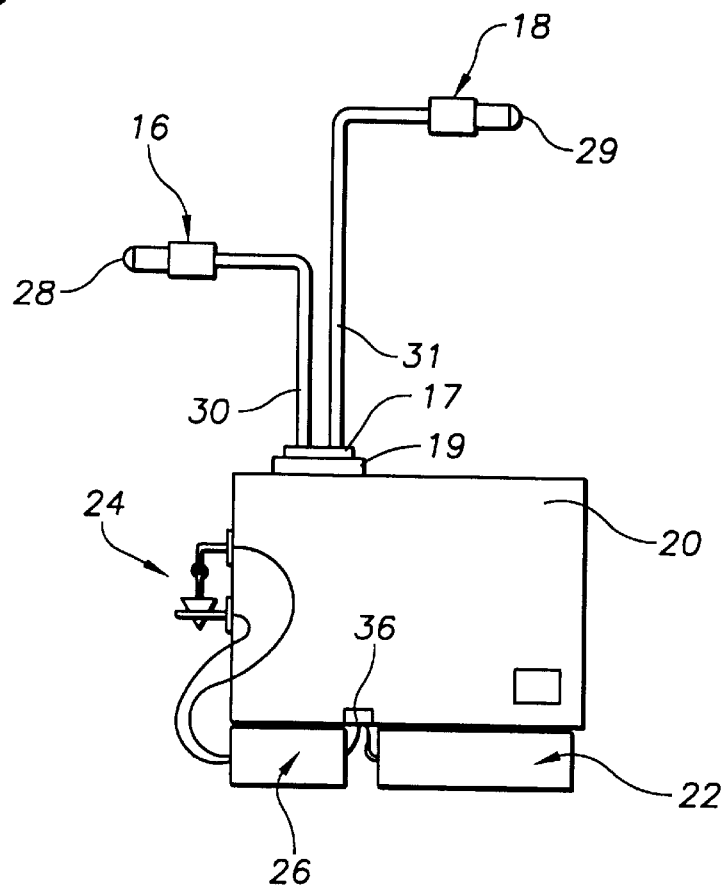
FIG. 3 is a plan side view of the exemplary door mountable security system of FIG. 1 in isolation showing the first fiber optic image conduit, the second fiber optic image conduit, the video camera, the prism image splitter, the miniature video recorder, the battery pack, the motion detecting device including the pendulum contact and the ring contact, and the timer output device.

Referring now to FIG. 3, first and second fiber optic image conduits 16,18 are lengths of conventional fiber optic image conduit. The free end of each fiber optic image conduit 16,18 is provided with a fish-eye lens 28,29, respectively. Use of a fish-eye lens provides the maximum image recording field of view and allows first and second fiber optic image conduits 16,18 to transmit images of as much area surrounding door 12 (FIG. 2) as possible to video camera 19. The second end 30,31 of each fiber optic image conduit 16,18 is visually coupled to video camera 19 by a two input prism image splitter 17. Prism image splitter 17 directs the images from first and second fiber optic image conduits 16,18 into the lens of video camera 19.

Referring back to FIG. 2, first fiber optic image conduit 16 is installed through the center of a "Wiser" type door knob 30 with fish-eye lens 28 extending out from the center. Second fiber optic image conduit 18 is installed within door 12 with fish eye lens 29 extending out through a one-half inch diameter lens hole 32 provided for that purpose. It can be seen that first fiber optic image conduit is situated to pick up and transmit images from the front of door 12 and second fiber optic image conduit 18 is situated to pick up and transmit images from in front of the door jam side of door 12 after door 12 has been opened.

Referring back to FIG. 3, miniature video recorder 20 is powered by conventional video battery power pack 22 and includes a video input in connection with the video output of video camera 19. Miniature video recorder 20 also includes an electrically activated record control input 36.

In this embodiment, timer output device 26 is a solid state timed output Flip-Flop circuit that has a predetermined control output period of five minutes. Timer output device 26 is triggered by motion detecting device 24.

Figure 4:
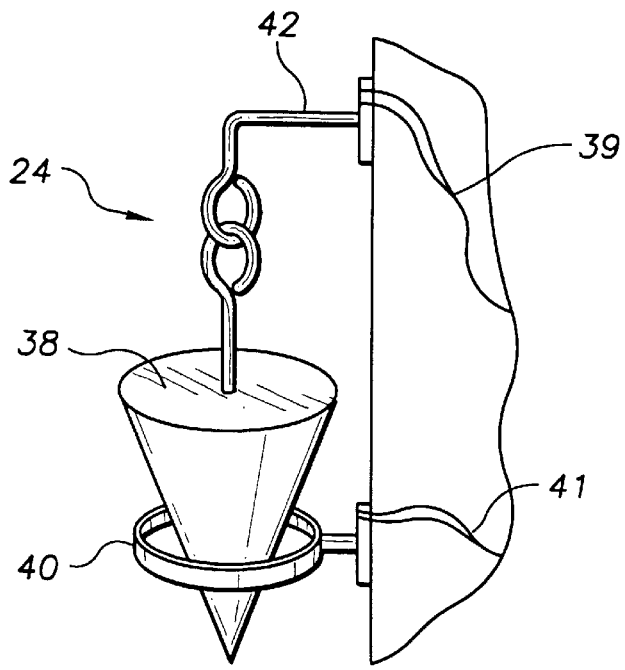
FIG. 4 is a detail perspective view of the motion detecting device in isolation showing the pendulum contact and the ring contact.

Referring to FIG. 4, motion detecting device 24 is wired to the control input of timer output device 26 by wires 39,41 and includes a pendulum switch having an electrically conductive plumb-bob pendulum contact 38 and an electrically conductive metal ring contact 40. Pendulum contact 38 is swingingly supported by a pendulum support 42. Movement of door 12 causes pendulum contact 38 to electrically contact ring contact 40 triggering timer output device 24. When timer output device 12 is triggered, the timer control output in electrical connection with electrically activated record control input 36 of miniature video recorder 20 causes miniature recorder 20 to record the video signal from video camera 19 capturing the image of the person or person traveling into or out of the building.

Figure 5:
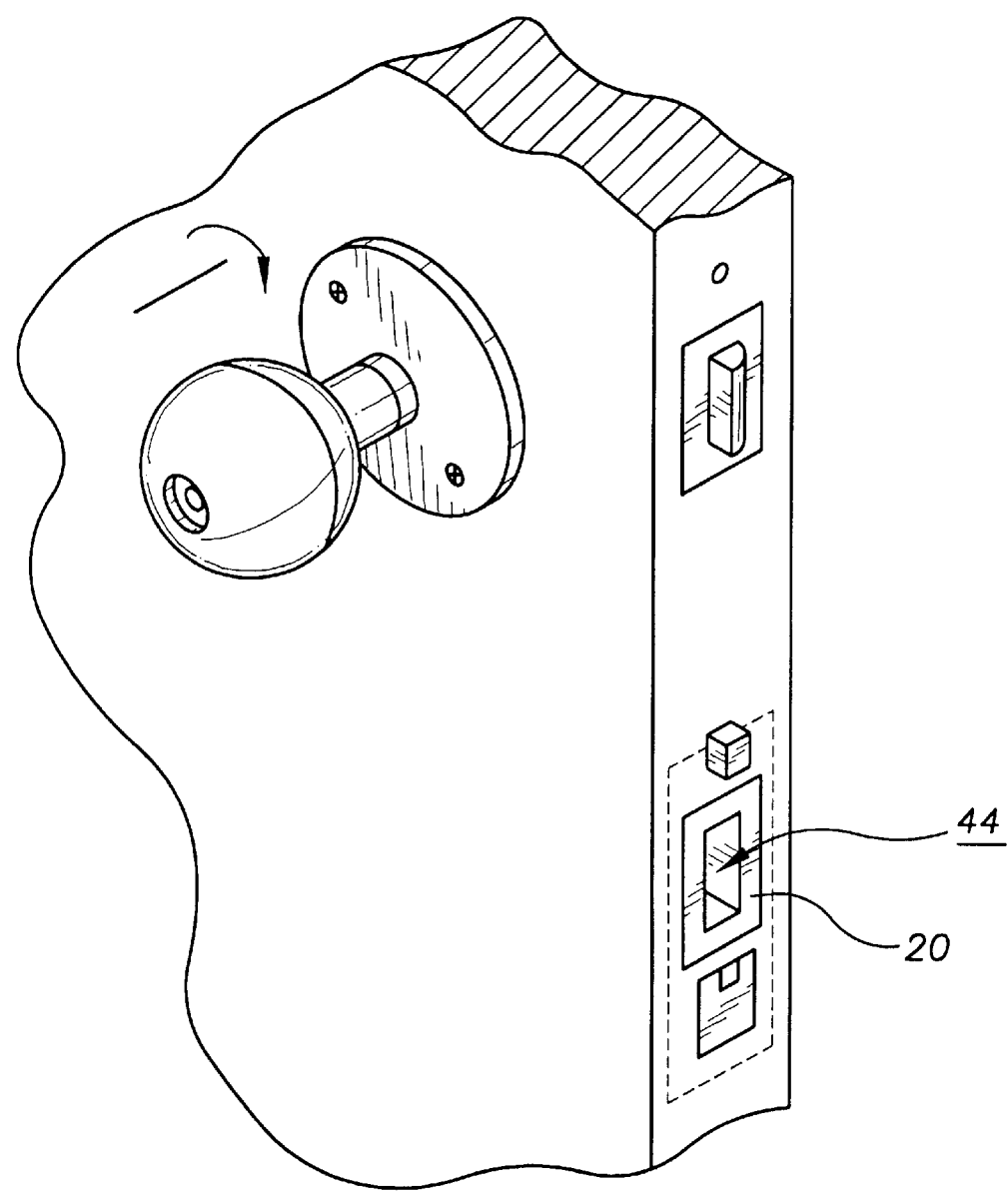
FIG. 5 is a partial perspective view of the exemplary door mountable security system of FIG. 1 installed in the representative door.

FIG. 5 shows a video cassette insertion port 44 into which high-8 format video cassettes are inserted into miniature video recorder 20 for use and removed for storage.

It can be seen from the preceding description that a door mountable security system has been provided that can monitor the comings and goings of individuals through an access door of a building; that can be mounted within an existing door in an inconspicuous manner; that can make a visual recording of each individual entering and leaving a building that can be stored and kept for a period of time; and that has at least one fiber optic image conduit, a video camera having a lens visually coupled to one end of the fiber optic image conduit, a video recording device in connection with the video camera, and a motion detecting device in controlling connection with the video recording device in a manner such that upon receipt of a signal from the motion detecting device the video recording device records the video signal from the video camera for a predetermined period of time.

It is noted that the embodiments of the door mountable security system described herein in detail for exemplary purposes are of course subject to many different variations in structure, design, application and methodology. Because many varying and different embodiments may be made within the scope of the inventive concept(s) herein taught, and because many modifications may be made in the embodiment here detailed in accordance with the descriptive requirements of the law, it is to be understood that the details herein are to be interpreted as illustrative and not in a limiting sense.

What is claimed is:

1. A door mountable security system comprising:
    a first fiber optic image conduit;
    a video camera having a lens visually coupled to one end of said fiber optic image conduit and a first video output;
    a miniature video recorder operable from a battery power source, said miniature video recorder having a video input in connection with said video output of said video camera and an electrically activated record control input;
    a battery pack in power supply connection with said miniature video recorder and having sufficient power output to power said miniature video recorder;
    a motion detecting device including a pendulum switch having an electrically conductive plumb-bob pendulum contact and an electrically conductive metal ring contact;
    a timer output device having a timed control output in electrical connection with said electrically activated record control input of said miniature video recorder and an electrical control input in electrical connection with said pendulum switch in a manner such that electrical contact between said pendulum contact and said ring contact causes said timed output of said timed output device to generate a signal activating said record control input of said video recorder for a predetermined period of time; and
    a door having a security device chamber formed therein and sized to receive said video camera, said miniature video recorder, said battery pack, said motion detecting device, and said timer output device; and wherein:
    one end of said first fiber optic image conduit is positioned within a hole formed through an external surface of said door.

2. The door mountable security system of claim 1, further including:
    a second fiber optic image conduit, and
    a prism image splitter; and wherein:
        said first and second fiber optic image conduits are visually coupled to said video camera through said prism image splitter.

3. The door mountable security system of claim 1 wherein:
    a free end of said second fiber optic image conduit is provided with a fish-eye lens.

4. The door mountable security system of claim 1, wherein:

said first fiber optic image conduit is installed through a door knob of said door.

5. The door mountable security system of claim 1 wherein:

said video recorder is a high-8 format video recorder.

6. The door mountable security system of claim 1 wherein:

a free end of said first fiber optic image conduit is provided with a fish-eye lens.

7. The door mountable security system of claim 2 wherein:

said video recorder is a high-8 format video recorder.

8. The door mountable security system of claim 2 wherein:

a free end of said first fiber optic image conduit is provided with a fish-eye lens.

9. The door mountable security system of claim 3 wherein:

said video recorder is a high-8 format video recorder.

10. The door mountable security system of claim 3 wherein:

a free end of said first fiber optic image conduit is provided with a fish-eye lens.

* * * * *